United States Patent
Kalva et al.

(10) Patent No.: US 7,149,770 B1
(45) Date of Patent: *Dec. 12, 2006

(54) METHOD AND SYSTEM FOR CLIENT-SERVER INTERACTION IN INTERACTIVE COMMUNICATIONS USING SERVER ROUTES

(75) Inventors: Hari Kalva, New York, NY (US); Alexandros Eleftheriadis, New York, NY (US)

(73) Assignee: The Trustees of Columbia University in the City of New York, New York, NY (US)

( * ) Notice: This patent issued on a continued prosecution application filed under 37 CFR 1.53(d), and is subject to the twenty year patent term provisions of 35 U.S.C. 154 (a)(2).

Subject to any disclaimer, the term of this patent is extended or adjusted under 35 U.S.C. 154(b) by 813 days.

(21) Appl. No.: 09/240,509

(22) Filed: Jan. 29, 1999

(51) Int. Cl.
*G06F 15/16* (2006.01)

(52) U.S. Cl. ..................... 709/203
(58) Field of Classification Search ........... 709/205, 709/218, 219, 231, 203
See application file for complete search history.

(56) References Cited

OTHER PUBLICATIONS

Wired for Speed: Efficient Routes on VRML 2.0, Virtual Reality Modeling Language Symposium, Woods, D. Norton, A., Bell, G., Feb. 24-26, 1997, Monterey, CA, pp. 133-138.*
An object-Oriented Approach to VRML Development, Beeson, C., Silicon Graphics, Inc. ACM 0-8971-886-x/97/02, pp. 17-24.*
VRML gets real the MPEG-4 way, Mulroy, P., BT Labs, Ipswich, UK, Teleconferencing Futures, IEEE Colloquium Jun. 1997, pp. 4/1-4/4.*
Using Java to intract with geo-referenced VRML within a Virtual Field Course, Moore, K.; Dykes, J.; Wood, J., Virtual Field Course, Department of Geography, Jun. 1997, pp. 1-12.*
D7.2, Review of VRML and WWW Techniques, Coven-Collaborative virtual environments, Apr. 1997, pp. 1-33.*
The Virtual Reality Modeling Language Annex D, ISO/IEC 14772-1: 1997, printed for the following site http://www/vrml.org/Specification/VRML97/part1/examples.html on Jun. 21, 2003.*
Populating the Internet: Supporting Multiple Users and Shared Applications with the VRML, Broll, W., ACM 0-89791-886, VRML Feb. 1997, pp. 33-40.*
International Organization for Standardisation ISO/IEC JTC 29/WG 11 Coding of moving pictured and audio, N1835, Oct. 1997, pp. 1-86.*

* cited by examiner

*Primary Examiner*—Beatriz Prieto
(74) *Attorney, Agent, or Firm*—Baker Botts LLP

(57) ABSTRACT

In an interactive communication system based on MPEG-4, Command descriptors along with Command Route nodes or Server Routes in the scene description can be used to support application-specific interactivity. Content selection can be supported by specifying the presentation in command parameters, with the command ID indicating that the command is a content selection command. An initial scene can be created with several images and with text that describes a presentation associated with an image. Associated with each image and the corresponding text is a content selection descriptor. When a user clicks on an image, the client transmits the command containing the selected presentation and the server starts a new presentation. The technique can be used in any application context, as generally as HTTP and CGI can be used to implement any server-based application functionality.

14 Claims, 12 Drawing Sheets

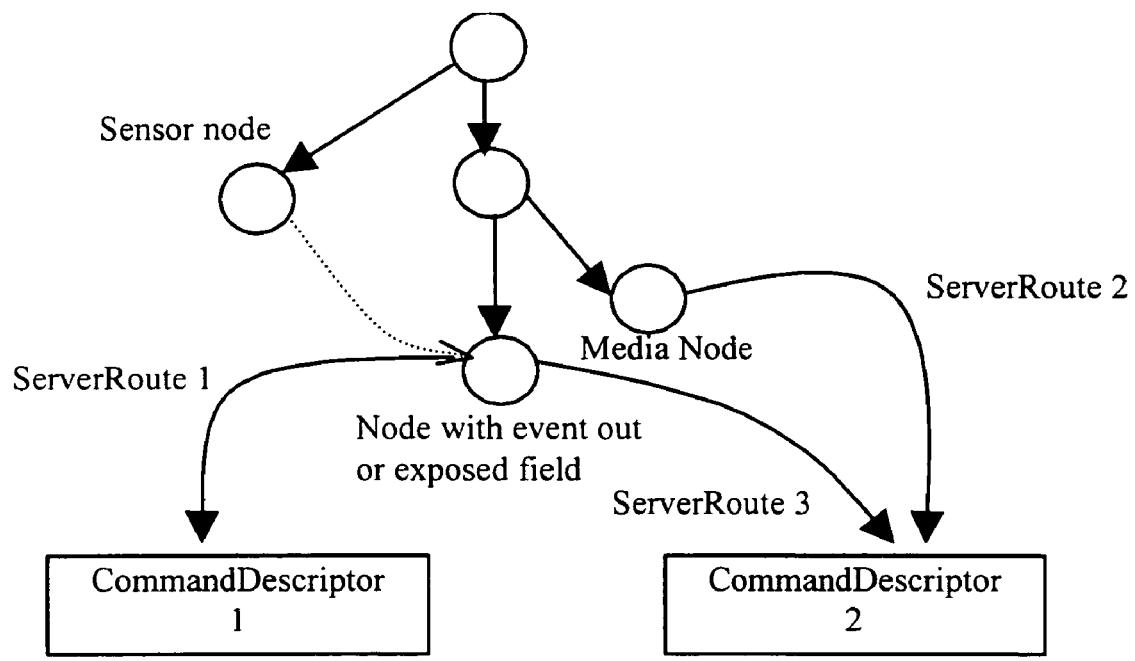
(a)
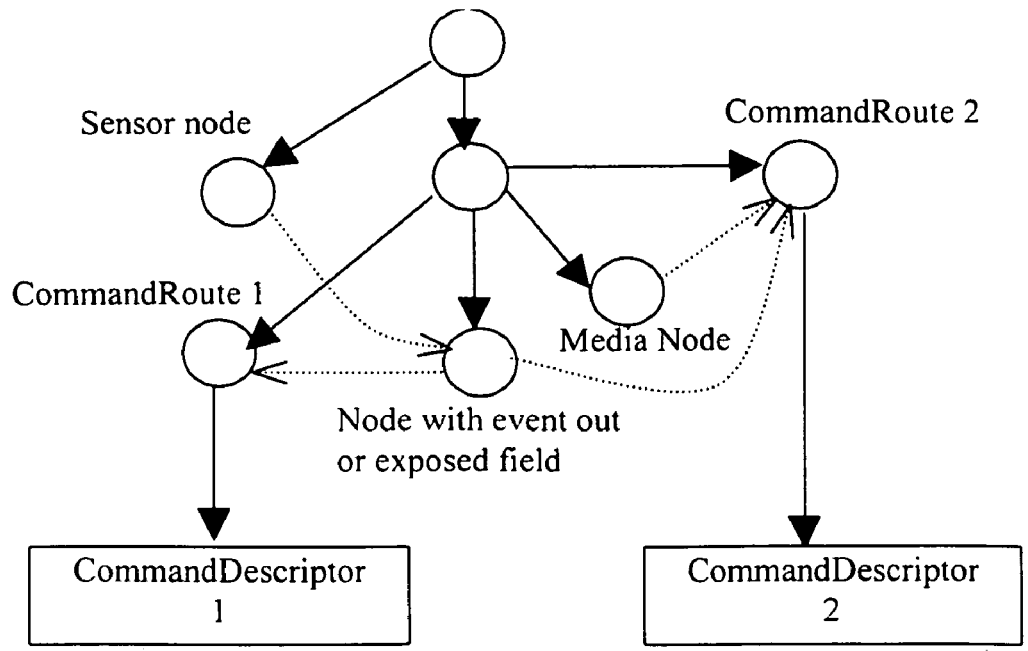
(b)
FIG. 5

```
class CommandDescriptor: bit(8) CommandDescriptorTag = 0x05 { bit(16) CommandDescriptorID;
      bit(16) CommandID;

bit(16) length;

// stream count; number of ES_IDs associated with this message
      unsigned int (8) count;

// ES_Id (channel numbers) of the streams affected by the command
      unsigned int (16) ES_ID[count];

// application-defined parameters
      do {
            unsigned int (8) paramLength;
            char (8) commandParam [paramLength];
      }
      while (paramLength!=0);
}
```

FIG. 6

```
class CommandDescriptorRemove: bit(8) CommandDescriptorRemoveTag = 0x06 {
      bit(16) CommandDescriptorID;
}
```

FIG. 7

```
class BIFSScene {
      SFNode nodes(SFTopNode);
      bit(1) hasROUTEs;
      if (hasROUTEs)
            ROUTEs routes ;
      bit(1) hasServerROUTEs;
      // the following is added to the MPEG-4 syntax
      if (hasServerROUTEs)
            ServerROUTEs sroutes;
}

// modification of MPEG-4 ROUTEs structure to point to command descriptor
class ServerROUTEs { bit(1) isUpdateable;
      if (isUpdateable)
            bit(10) srouteID;

bit(10) outNodeID;
      NodeData nodeOUT = GetNodeFromID(outNodeID); // get source node
      int(nodeOUT.nOUTbits) outFieldRef; // event source field index bit(10) CD_ID; // event sink - command descriptor ID
}
```

FIG. 8

CommandRoute

Node interface

CommandRoute {
    eventIn      SFBool      Execute                  FALSE
    field        SFUrl       CommandDescriptor   []
}

Functionality and semantics

The CommandRoute node is used to support server interaction. A command route is executed when an event is received on the execute field, for example, from a touch sensor. The execution of a command route involves communicating the command pointed by the commandDescriptor to the server. The commandDescriptor field contains either a URL to the command descriptor or the ID of the Command Descriptor to be associated with this CommandRoute node. Commands are typically sent to a server using DMIF's DAI_User_Command primitives. The node update mechanism can be used to change the command descriptor ID. This allows supporting different interaction behavior for the same user interaction at different times (before and after node update).

FIG. 9

| Command Name | Command ID |
|---|---|
| Unused | 0X0000 |
| Start | 0X0001 |
| Stop | 0X0002 |
| Pause | 0X0003 |
| Forward | 0X0004 |
| Reverse | 0X0005 |
| ContentSelection | 0X0006 |
| MPEG-4 reserved | 0X0007 - 0X00FF |
| User Defined | 0X0100 - 0XFFFF |

FIG. 10

```
class Commmand {

// command ID
    bit(16) CommandID;

// the following are simply copied from the command descriptor
    // stream count; number of ES_IDs associated to this message
    unsigned int (8) count;

// ES_Id of the streams
    unsigned int (16) ES_ID[count];

// application-defined parameters
    do {
        unsigned int (8) paramLength;
        char (8) commandParam [paramLength];
    }
    while (paramLength!=0);
}
```

FIG. 11

METHOD AND SYSTEM FOR CLIENT-SERVER INTERACTION IN INTERACTIVE COMMUNICATIONS USING SERVER ROUTES

TECHNICAL FIELD

The present invention relates to techniques for performing client-server interaction in communication systems and, more particularly, in communication systems based on the MPEG-4 standard.

BACKGROUND OF THE INVENTION

Interactivity is a prominent concern in the development of the MPEG-4 international standard (ISO/IEC 14496 Parts 1–6, Committee Draft, Oct. 31, 1997, Fribourg, Switzerland). A back channel is specified for interactive message support. However, the syntax and semantics of the messages to be carried through that channel remain unspecified, and so does the mechanism that triggers the transmission of such messages. Existing standards such as DSM-CC (ISO/IEC International Standard 13818-6) and RTSP (RFC 2326) support traditional VCR-type interactivity to reposition a media stream during playback, but this is inadequate for MPEG-4 applications which require more complex interactive control.

An Interactive message can be generated by a certain user action or system event. It will then be sent to the server which in turn may modify the stream(s) it is delivering by adding or removing objects, or switching to an entirely new scene. User actions may include clicking on an object, input of a text stream, etc. System events include timers, conditional tests, etc.

Interactivity is application-specific, and one cannot define interactive behavior completely in terms of user events. To support application-specific interactivity, a CGI-like approach should be adopted. Specific user events cause application-specific command data to be sent back to the server. The server can then respond, typically by sending a scene description update command. This allows complete freedom for supporting full interactivity as may be required by applications.

MPEG-4 essentially uses two modes of interactivity: local and remote. Local interactivity can be fully implemented using the native event architecture of MPEG-4 BIFS (Binary Format for Scenes), which is based on the VRML 2.0 ROUTEs design (see www.vrml.org and "The VRML Handbook", J. Hartman and J. Wernecke, Addison-Wesley, 1996) and documented in Part 1 of the MPEG-4 specification (Systems). If the MPEG-4 receiver is hosted in another application, events that need to be communicated to the MPEG-4 receiver by the application can be translated to BIFS update commands, as defined in Part 1 of MPEG-4.

Remote interactivity currently consists of URLs. As defined in the MPEG-4 Systems Committee Draft, these can only be used to obtain access to content. As a result, they cannot be used to trigger commands.

The fact that MPEG-4 Systems already contains local interactive support via the use of event source/sink routes that are part of the scene description (BIFS) makes it desirable to have a server interaction process that fully integrates with the local interactivity model.

SUMMARY OF THE INVENTION

An objective of the present invention is to provide a technique for communicating messages between two entities such as "client" and "server", utilizing the MPEG-4 international standard.

A second objective of the present invention is to provide a technique for allowing the user or the system to generate such messages in the context of an MPEG-4 player of client.

A third objective is to provide a technique for generating such messages consistent with the local interactivity model defined in MPEG-4, which is based on the VRML 2.0 specification.

A further objective is to provide a technique for encoding such messages within an MPEG-4 bitstream, as well as to link the encoded messages to the scene description.

Still a further objective is to provide a technique for encoding such messages in a way that allows a server to easily modify them before sending them for use by the client. This is important for interactive applications. An example is "cookie" management where a server must be able to quickly update the content of the command with a codeword that stores state information about the user's activities on the particular site.

In order to meet these and other objectives which will become apparent with reference to further disclosure set forth below, the present invention broadly provides a technique for incorporating server commands into MPEG-4 clients. The technique involves the use of command descriptors, i.e. a special form of descriptors that are transmitted together with the scene description information and contain the command to be sent back to a server upon triggering of an associated event. The desired event sources in the scene description are associated with these command descriptors.

In one embodiment, the association is performed using server routes. These operate similarly to traditional MPEG-4 BIFS routes, but instead of linking a source field with a sink field they link a source field with a sink command descriptor. Server routes require an extension of the MPEG-4 BIFS ROUTE syntax.

In another embodiment, the association is performed using command nodes. Such nodes contain sink fields, and are associated with command descriptors. This technique involves the addition of one more node type to the set of MPEG-4 BIFS nodes.

In both cases, the normal interaction model defined by MPEG-4 can be used for both local interactivity, i.e. events generated and processed on the local clients, as well as server interactivity, i.e. as events generated on the client generate commands that are sent back to the server. Upon triggering of an event associated with a command descriptor, either via a server route or a regular route to a command node, the client obtains the command information stored in the command descriptor, packages it into a command message, preferably using the syntax provided in the preferred embodiment, and transmits it back to the server using the appropriate back channel.

The data to be carried by the generated command back to the server are contained in the command descriptor. Since command descriptors are part of the overall descriptor framework of MPEG-4, they can be dynamically updated, using time stamped object descriptor updates. This provides considerable flexibility in customizing commands, for example to perform "cookie" management.

To further aid the server in processing the generated command, additional information such as the time the event was generated, the source node, etc., are also contained in the client's message.

BRIEF DESCRIPTION OF THE DRAWING

FIG. 5 illustrates the method of associating scene description nodes, especially sensor nodes, to command descriptors using: (a) server routes, and (b) command route nodes.

FIG. 6 shows the binary syntax of the command descriptor as described in a preferred embodiment.

FIG. 7 shows the binary syntax of the command descriptor remove command as described in the preferred embodiment.

FIG. 8 shows the binary syntax of the server route structure, and how it is added to the main MPEG-4 BIFS scene syntax.

FIG. 9 shows the node syntax and semantics of the Command Route structure.

FIG. 10 shows an indicative list of predefined Command IDs and their associated interpretation.

FIG. 11 shows the binary syntax of the command contained in a command descriptor for the preferred embodiment.

DETAILED DESCRIPTION

Reference will now be made in detail to the preferred embodiment of the invention as illustrated in the figures.

MPEG-4 is an international standard being developed under the auspices of the International Standardization Organization (ISO). Its official designation is ISO/IEC 14496. Its basic difference with previous ISO or ITU standards such as MPEG-1, MPEG-2, H. 261, or H. 263 is that is addresses there presentation of audiovisual objects. Thus, the different elements comprising an audiovisual scene are first encoded separately, using techniques that are being defined in Parts 2 (Visual) and 3 (Audio) of the specification. These objects are transmitted to the receiver or read from a mass storage device together with scene description information that describes how these objects are to be placed in space and time in order to be presented to the user.

The coded data for each audiovisual object as well as the scene description information proper are transmitted in their own "channels" or elementary streams. Additional control information is also transmitted, as further discussed below, in order to allow the receiver to correctly associate audio visual objects referenced in the scene with the elementary streams that contain their encoded data.

Figure 1:
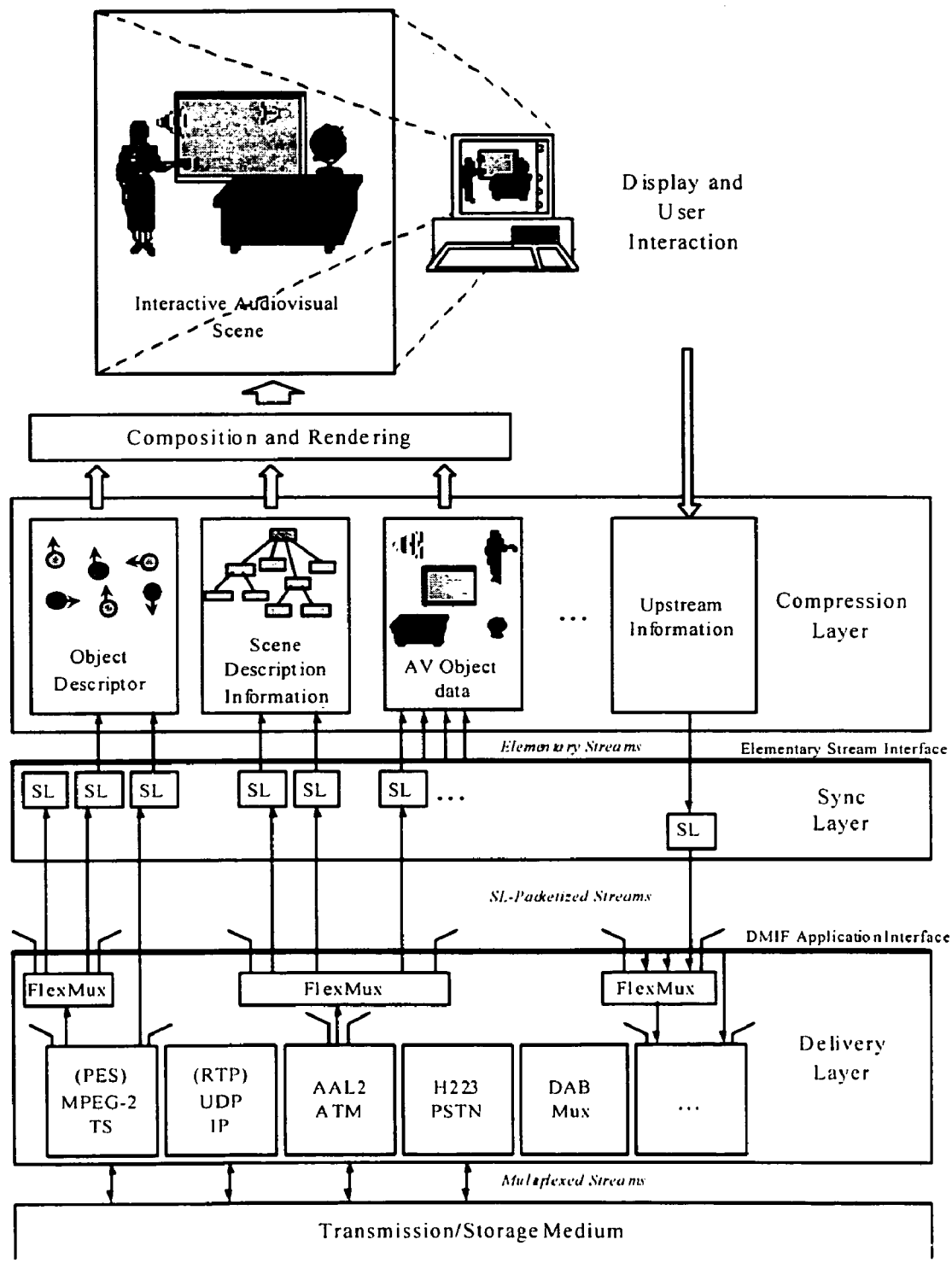
FIG. 1 is a diagram illustrating the overall structure of an MPEG-4 client or terminal.

In order to fully describe the structure of MPEG-4, we refer to FIG. 1. At the bottom of the figure, the various possible delivery systems are shown, including (but not limited to) ATM, IP, MPEG-2 Transport Stream (TS), DVB, either over a communication link or a mass storage device. In contrast to MPEG-2, MPEG-4 does not define its own transport layer facility, in order to allow delivery over a wide variety of communication environments. For delivery systems that may lack appropriate multiplexing capability, e.g. GSM wireless data channels, or that require low delay, a simple multiplexing tool called FlexMux is defined.

This infrastructure is used to deliver to the client a set of elementary streams. The streams contain any one of scene description information, audio visual object data (e.g. coded video, such as an MPEG-2 or MPEG-4 video stream), or control information (namely, object descriptors). Each elementary stream can contain data of only one type.

The data contained in an elementary stream are packaged according to the MPEG-4 Sync Layer (SL), which packages access units of the underlying medium (e.g., a frame of video or audio, or a scene description command) and adds timing information (clock references and time stamps), sequence numbers, etc. The SL is shown at the middle portion of FIG. 1.

Encoding of individual audiovisual object data is performed according to Parts 2 and 3 of the MPEG-4 specification. It is furthermore allowed to utilize other encodings, such as MPEG-1 or MPEG-2. The scene description as well as the control information (object descriptors) is encoded as defined in Part 1 of MPEG-4.

The receiver processes the scene description information as well as the decoded audiovisual object data and performs composition, i.e. the process of combining the objects together in a single unit, and rendering, i.e. the process of displaying the result in the user's monitor or playing it back in the user's speaker is in the case of audio. This is shown at the top of FIG. 1.

Depending on the information contained in the scene description, the user may have the opportunity to interact with the scene. In addition, the scene description may contain information that enables dynamic behavior. In other words, the scene itself may generate events, without user intervention.

Figure 2:
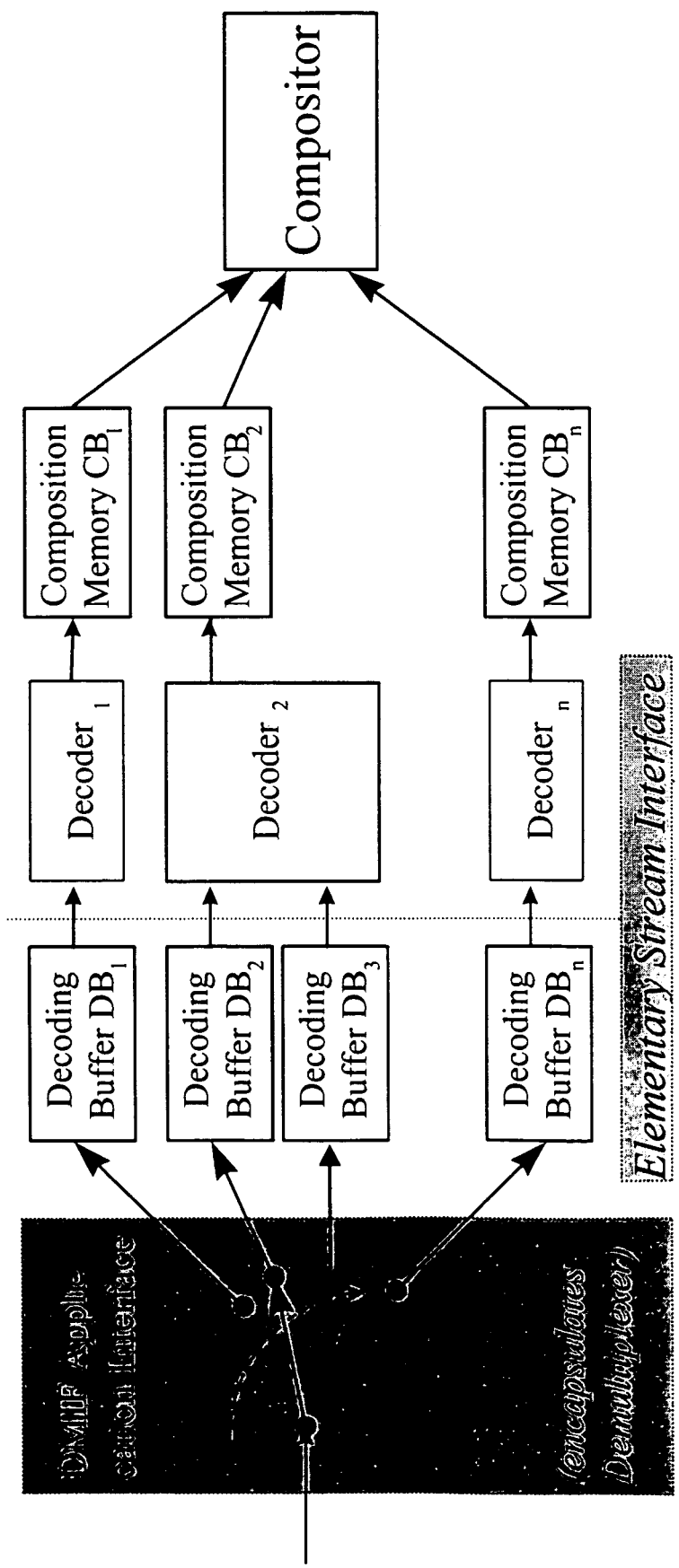
FIG. 2 shows the MPEG-4 System Decoder Model.

The object-based structure of MPEG-4 necessitated the definition of a more general system decoder model compared with MPEG-2 or other systems. In particular, as shown in FIG. 2, the receiver is considered to be equipped with a set of decoders, one for each object. Each decoder has a decoding buffer, as well as a composition buffer. Decoding buffers are managed by the sender using techniques similar to MPEG-2, i.e., clock references for clock recovery, and decoding time stamps for removal of data from the decoding buffer followed by theoretically instantaneous decoding. Data placed in composition buffers are available for use by the compositor, and overwrite any previously placed data. The decoding buffers are filled by the demultiplexer, which is encapsulated within the DMIF (Digital Media Integration Framework, Part 6 of MPEG-4) Application Interface. This is a conceptual interface, requiring no further description here.

MPEG-4 Scene Description

The scene description information in MPEG-4 is an extension of VRML 2.0 (Virtual Reality Modeling Language) specification. VRML uses a tree structured approach to define scenes. Each node in the scene performs a composition and/or grouping operation, with the leaves containing the actual visual or audio information. Furthermore, nodes contain fields that affect their behavior. For example, a Transform node contains a Rotation field to define the angle of rotation.

MPEG-4 defines some additional nodes that address 2-D composition, as VRML is a purely 3-D scene description language. This addresses the needs of applications that focus on low-cost systems. In contrast to VRML, MPEG-4 does not use a text-based scene description but instead defines a bandwidth-efficient compressed representation called BIFS (Binary Format for Scenes).

The BIFS encoding follows closely the textual specification of VRML scenes. In particular, node coding is performed in a depth-first fashion, similarly to text-based VRML files. As in VRML, the fields of each type of node assume default values. Hence only fields that have non-default values need to be specified within each node. Field coding within a node is performed using a simple index-based method followed by the value of the coded field. Node type coding is more complicated. In order to further increase band width efficiency the context of the parent field (if any) is taken into account. Each field that accepts children nodes is associated with a particular node data type. Nodes are then encoded using an index which is particular to this node data type, in known fashion.

Each coded node can also be assigned a node identifier (an integer, typically). This allows the reuse of that node in other places in the scene. This is identical to the USE/DEF mechanism of VRML. More important, however, is the fact that it allows it to participate in the interaction process.

The interaction model used in MPEG-4 is the same as in VRML. In particular, fields of a node can act as event sources, event sinks, or both. An event source is associated with a particular user action or system event. Example of user event are sensor nodes that can detect when the mouse has been clicked. Example of system events are timers (TimeSensor node) that are triggered according to the system's time.

Dynamic scene behavior and interactivity are effected by linking event source fields to event sink fields. The actual linking is performed using the mechanism of ROUTEs. MPEG-4 route specifications, if any, are given immediately after the scene node descriptions. Their encoding is based on the node identifiers for the source and sink nodes, as well as the field indices of the source and sink fields.

An important distinction between VRML and MPEG-4 is that in the latter, scene descriptions can be updated dynamically using time-stamped commands. In Contrast, VRML operates on static "worlds". After a world is loaded, there is no mechanism to modify it. In MPEG-4, objects can be added or deleted, and parts of the scene (or the entire scene) can be replaced.

Object Descriptors

In order to have a very flexible structure (facilitating editing, etc.), the actual content of audiovisual objects is not contained within the scene description itself. In other words, BIFS only provides the information for the scene structure, as well as objects that are purely synthetic, e.g. a red rectangle that is constructed using BIFS/VRML nodes. Audio visual objects that require coded information are represented in the scene by leaf nodes which either point to a URL or an object descriptor.

Object descriptors are hierarchically structured information that describe the elementary streams that comprise the coded representation of a single audio visual object. More than one stream may be required, e.g. for stereo or multi-language audio, or hierarchically coded video. The topmost descriptor is called object descriptor, and is a shell that is used to associate an object descriptor identifier (OD-ID) with a set of elementary stream descriptors. The latter contain an ES-ID as well as information about the type of data contained in the elementary stream associated with the particular ES-ID. This information tells the receiver, e.g, that a stream contains MPEG-2 Video data, following the Mail Profile at the Main Level.

The mapping of the ES-ID to an actual elementary stream is performed using a stream map table. For example, it may associate ES-ID 10 with support number 1025. This table is made available to the receiver during session set up. The use of multiple levels of indirection facilitates manipulation of MPEG-4 content. For example, remultiplexing would only require a different stream map table. No other information would have to be modified within the MPEG-4 content.

Object descriptors are transmitted in their own elementary streams, and are packaged in commands according to the Sync Layer syntax. This allows object descriptors to be updated, added, or removed.

Figure 3:
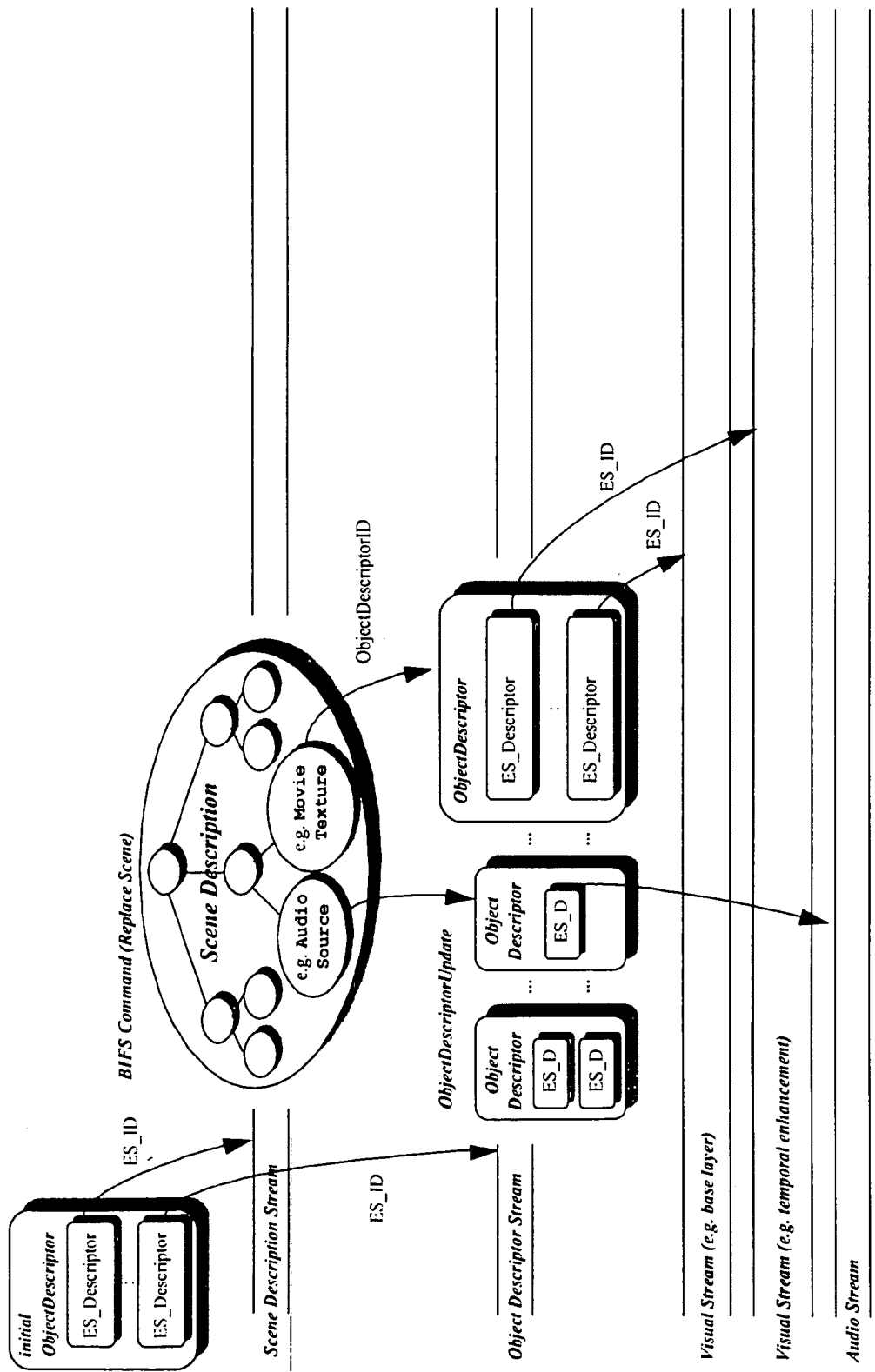
FIG. 3 illustrates the method used in MPEG-4 for associating audio visual objects with their encoded data in other streams via object descriptors and elementary stream descriptors.

FIG. 3 depicts the process with which object descriptors and elementary stream descriptors are used to associate audiovisual objects in the scene description with their elementary streams. First, a special Initial Object Descriptor is used to bootstrap the MPEG-4 receiver by pointing to the object descriptor stream and the scene descriptor stream associated with the selected content. This descriptor is delivered to the receiver during session set up.

The scene description in this example contains an Audio Source node, which points to one of the object descriptors. The descriptor, in turn, contains an elementary stream descriptor that provides the ES-ID for the associated stream. The ES-ID is resolved to an actual transport channel using the stream map table. The scene also has a Movie Texture node that, in this case, uses scalable video with two streams. As a result, two elementary stream descriptors are contained, each pointing to the appropriate stream (base and enhancement layer).

MPEG-4 Client/Server Interaction

From the preceding description, and considering the MPEG-4/VRML scene description framework, it is evident that while a rich local interaction framework is provided, there is no facility to effect server-based interaction. In particular, there is no mechanism with which to either describe messages that are to be sent back to a server, or trigger the generation of such messages.

Figure 4:
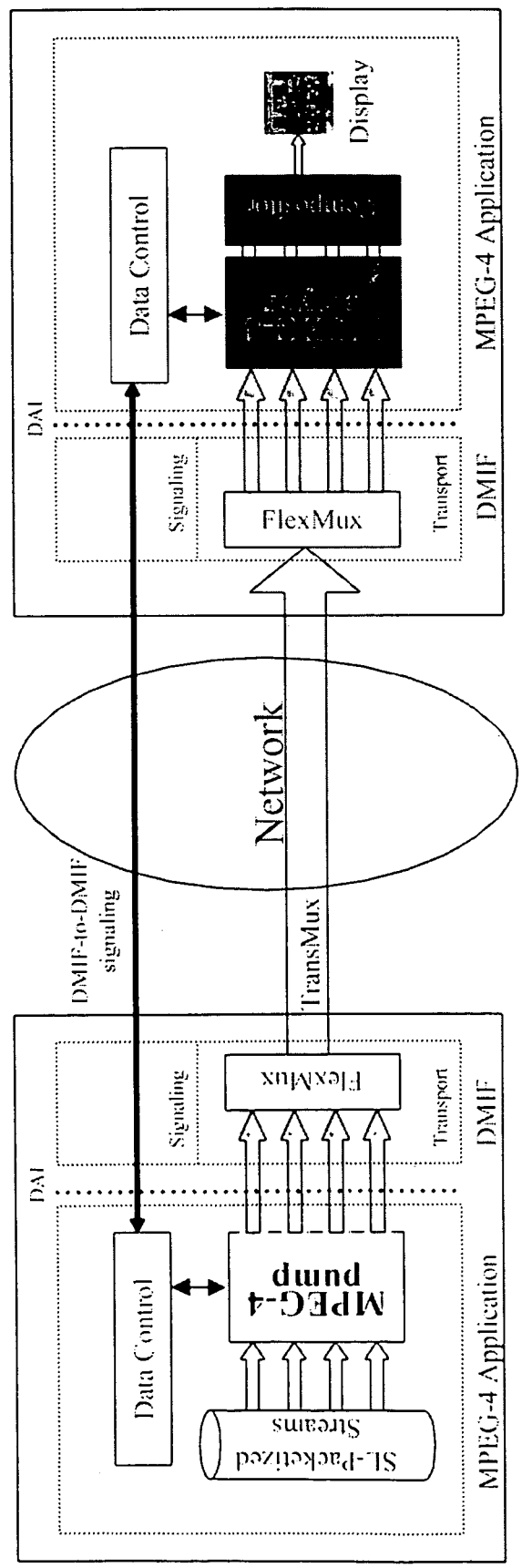
FIG. 4 shows a generic configuration of a client/server MPEG-4-based communication system.

FIG. 4 depicts an example client/server environment. On the left side of the figure there is an MPEG-4 server, including a pump that performs timed transmission of data read as SL-packetized streams, and an instance of a DMIF service provider, in this case utilizing the MPEG-4FlexMux multiplexing tool.

The use of FlexMux is optional. Other server structures can be used, as known in the art. For example, the data source could be an MPEG-4 file instead of SL-packetized streams.

The information generated at the server is sent across a network (e.g. IP or ATM) to the receiver. On the receiving side, we have a similar instance of a DMIF service provider which delivers demultiplexed elementary streams to the player. The DMIF-to-DMIF signaling is one method of performing session set up, and is described in Part 6 of MPEG-4. Other methods are possible, as known in the art, including Internet-based protocols such as SIP, SDP, RTSP, etc.

One of the main objectives of the present invention is a process with which server commands can be first described and transmitted from the server to the client, then triggered at the client at the appropriate times, and finally sent back to the server in order to initiate further action.

Command Descriptors

The Command Descriptor framework provides a means for associating commands with event sources within the nodes of a scene graph. When a user interacts with the scene, the associated event is triggered and the commands are subsequently processed and transmitted back to the server.

The actual interaction itself is specified by the content creator and may be a mouse click or mouse-over or some other form of interaction (e.g., a system event).

The command descriptor framework consists of three elements, a Command Descriptor, a server route or Command Route node, and a Command.

A Command Descriptor contains an ID (an integer identifier) as well as the actual command that will eventually be transmitted back to the server if and when an associated event is triggered.

The ID is used to refer to this command descriptor from the scene description information. By separating the command descriptor and the command it contains from the scene itself, we allow for more than one event to use the same command. This also permits modification of the command without changing the scene description in any way.

The association of the Command Descriptors to the event source field node can be performed in different ways.

First, a Server Route can be added to the regular route facility of BIFS. The difference with traditional routes is that the target of the route is not another field, but rather the command descriptor. This structure is depicted in FIG. 5(a). In this example we have two nodes in a scene tree fielding events to two command descriptors. A sensor node triggers an event to another node with an event source, event out, or event source/sink, exposed Field in MPEG-4 terminology, which in turn is routed via a server route to Command Descriptor 1. For Command Descriptor 2, there are direct server routes from the nodes to the descriptor.

A second approach consists of adding a new Command Route node type to the list of nodes supported by MPEG-4. This node has an 'execute' event sink field, as well as a field containing the command descriptor ID. Whenever the 'execute' field receives an event, using regular MPEG-4/VRML routes, the command descriptor associated with that ID is used to issue a command back to the server. This structure is depicted in FIG. 5(b). As compared with FIG. 5(a), the Server Routes are substituted with Command Route nodes. The operation in the two cases is essentially the same.

The Command Descriptor syntax is shown in FIG. 6. We use the Flavor media representation language to describe the bit stream syntax, which is also used in Part 1 of the MPEG-4 specification (see www.ee.columbia.edu/flavor or Part 1 of MPEG-4). The command descriptor begins with a special tag that identifies it as a descriptor of this particular type. We then have the descriptor ID, followed by a command ID. The latter is used to signal predefined server commands, such as "start", "pause", or "stop". Following that, we have the length indication of the remaining data in the descriptor, counted in bytes. Then, a count of the number of ES-IDs that will be provided to transmit the message back to the server(s). More than one is given in case we want to effect one-to-many communication, i.e. a single command to be communicated to multiple servers. This is followed by the series of the desired ES-IDs. Finally, a set of application-specific parameters are included. These will be passed back to the server when the command is triggered. Depending on the value of the command ID, the semantics of these parameters may be predefined.

The byte-oriented structure of the Command Descriptor allows it to be very easily generated on-the-fly by the server. This is an important feature for applications that involve "cookie" management, among others, where the command parameters need to be continuously updated by the server after processing each user event.

In order to update a Command Descriptor, the server or content creator only needs to submit a new one with the same ID.

In order to remove a Command Descriptor, a special command is provided. The syntax is shown in FIG. 7. The command begins with a tag that identifies this descriptor as a Command Descriptor Remove command. It is then followed by the ID of the Command Descriptor to be removed.

Both the Command Descriptor and Command Descriptor Remove structures can be carried within the object descriptor stream. Due to the structure of the object descriptor framework, using tags to identify descriptors, these can be interspersed with other descriptors.

As mentioned above, there are two ways to link the Command Descriptors to the scene. The first one relies on server routes. These require an extension of the bit stream syntax of the scene description of MPEG-4 as shown in FIG. 8. In particular, the main BIFS Scene structure is extended to include Server ROUTE structures. The only difference between a regular ROUTE and a Server ROUTE is that instead of a target node/field the ID of the target command descriptor is specified. It is known to those skilled in the art how to modify other ROUTE commands (insertion, deletion, etc.) in order to accommodate Server ROUTEs. In all cases, the target node/field pair needs to be changed to indicate the target Command Descriptor.

Using the Command Route node approach, a new node type needs to be defined. The node definition is provided in FIG. 9, using the standard node definition table used in Part 1 of the MPEG-4 specification. The node contains only two fields, namely an 'execute' field that serves as an event sink, and a 'command Descriptor' field which contains either a URL pointing to a Command Descriptor or the ID of the Command Descriptor to be associated with this Command Route node. As with all SFUrl fields, selection between ID and URL is performed using a one-bit flag (SFUrl field encoding is defined in Part 1 of MPEG-4).

Using the Command Route node approach, changes to the association of events with Command Descriptors can be performed using the standard MPEG-4 BIFS commands for changing nodes and fields within them.

Command descriptors can be updated using command descriptor updates allowing a node to support different interaction behavior at different times depending on the command in the command descriptor. The commands are transmitted to the server using the DAI user command primitives supported by DMIF.

It is also possible to extend the command descriptor to include the protocols used to transmit the commands. For example a different tag can be used to indicate submission using HTTP POST/GET, rather than the standard MPEG-4 facilities.

Even though the command descriptor framework is generic and supports application-specific user interaction, a few standard commands are needed in order to support consistent application behavior across applications and servers. This is particularly true for common commands such as stream control. As a result, we specify a set of common control commands. A server should be aware of any application specific commands in order to process them. The set Of standard commands allows interoperation with any server. FIG. 10 shows a set of commands together with their command IDs for this embodiment. Other assignments are also possible, as is evident to persons skilled in the art.

FIG. 11 depicts the syntax of the command as it is sent from the client to the server. It is essentially a copy of the Command Descriptor, minus the descriptor ID. In particular, it contains the Command ID, the set of ES-IDs to which this command was transmitted, as well as the set of parameters that were specified in the Command Descriptor. These commands are transmitted in SL-packetized streams, and hence full timing and sequencing information can be made available to the server.

Processing Events For Dispatching Server Commands

We now discuss in detail the process of generating commands based on user or system events, starting with the use of Server ROUTEs.

Figure 12:
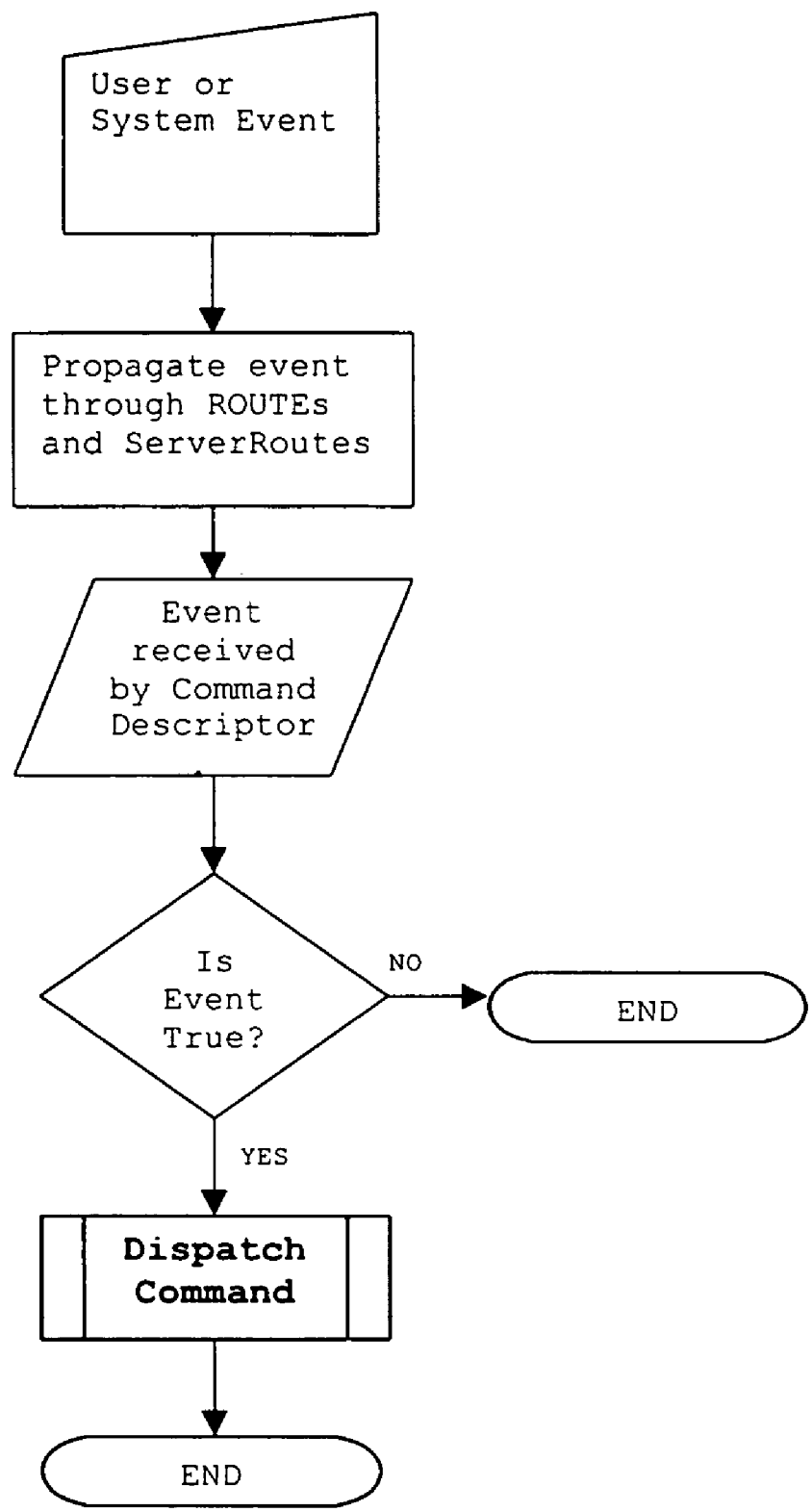
FIG. 12 is a flow diagram illustrating the process of triggering a server command in an MPEG-4 client, when Server Routes are used.

Referring to FIG. 12, upon the generation of a user or system event, the receiver propagates the event through the network of ROUTEs and Server ROUTEs. For the purposes of event propagation, the type of ROUTE does not matter, so that the same algorithm can be used. If an event is propagated through a Server Route, the system checks if that event corresponds to a condition associated with the logical True value. If no, the server command processing terminates; yes, then the dispatch process is executed.

Figure 13:
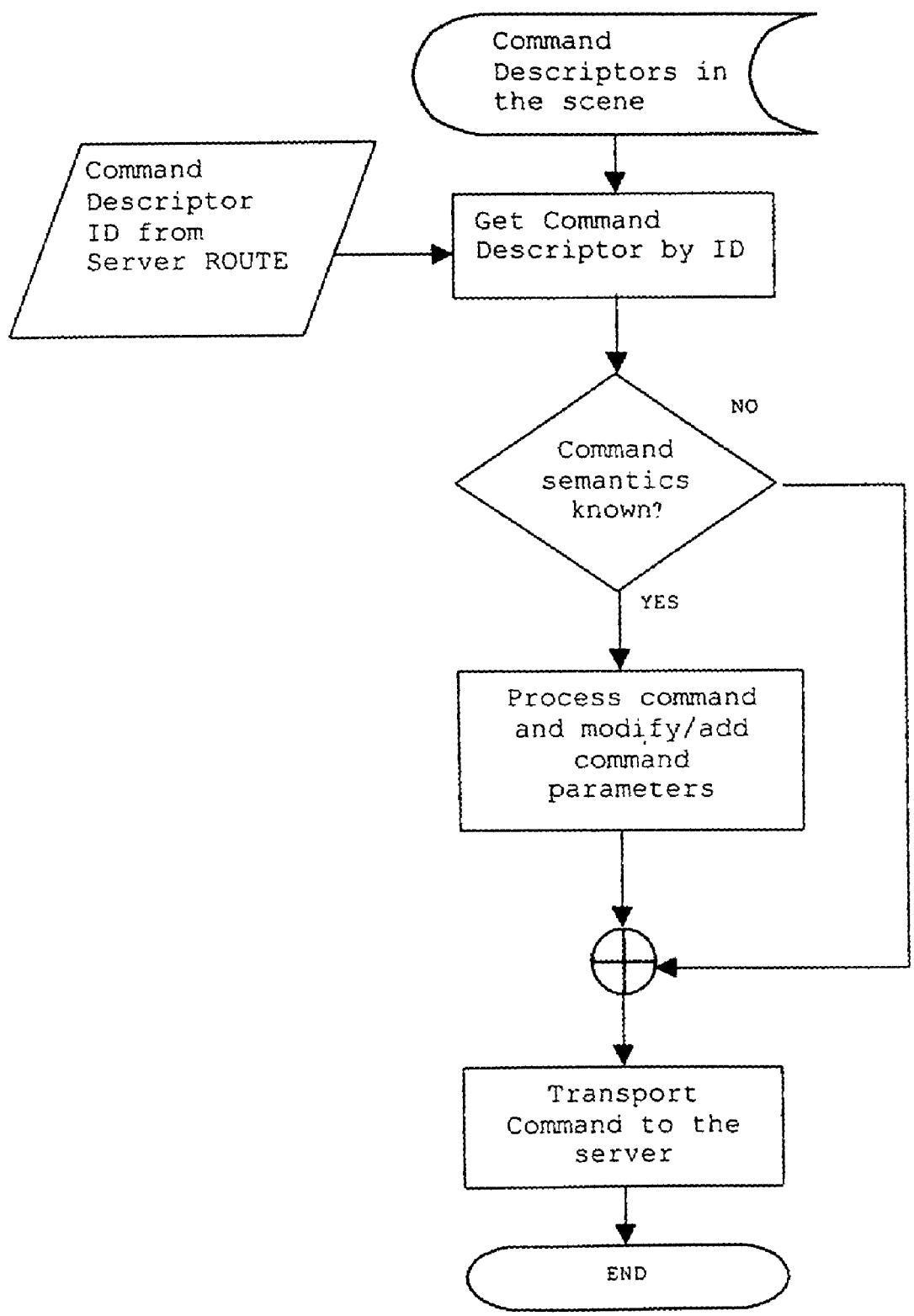
FIG. 13 is a flow diagram illustrating the process of assembling the data to be placed in the command sent back to the server, when Server Routes are used.

This process, for the Server Route case, is depicted in FIG. 13. The process obtains the Command Descriptor ID from the Server Route. It then correlates it with the information it has on the Command Descriptors available in tie scene. If no match is found, this is an error and no further action is taken. If a match is found, then the system examines the command ID in order to see if it corresponds to known semantics (pre-defined command IDs). If it corresponds to known semantics then the system may process the command parameters according to the desired semantics. If it does not correspond to known semantics then the system skips this state, and directly packages the indicated Command and transmits it to the server.

Figure 14:
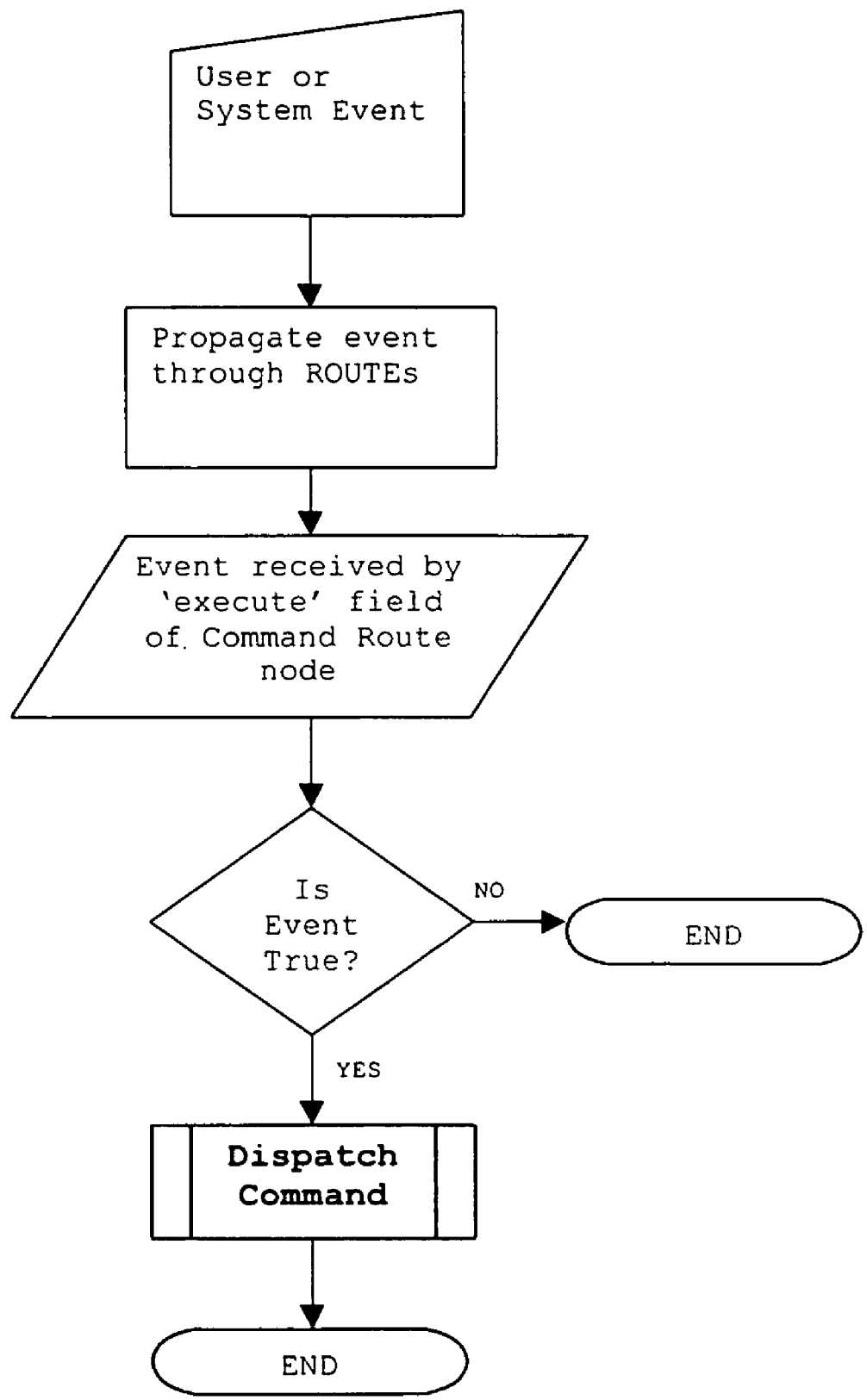
FIG. 14 is a flow diagram illustrating the process of triggering a server command in an MPEG-4 client, when Command Route nodes are used.

In the case of Command Route nodes, referring to FIG. 14, upon the generation of a user or system event, the receiver propagates the event through the network of ROUTEs. If an event reached the 'execute' field of a Command Route node, the system check if that event corresponds to a condition associated with the logical True value. If no, server command processing terminates; if yes, the dispatch process is executed.

Figure 15:
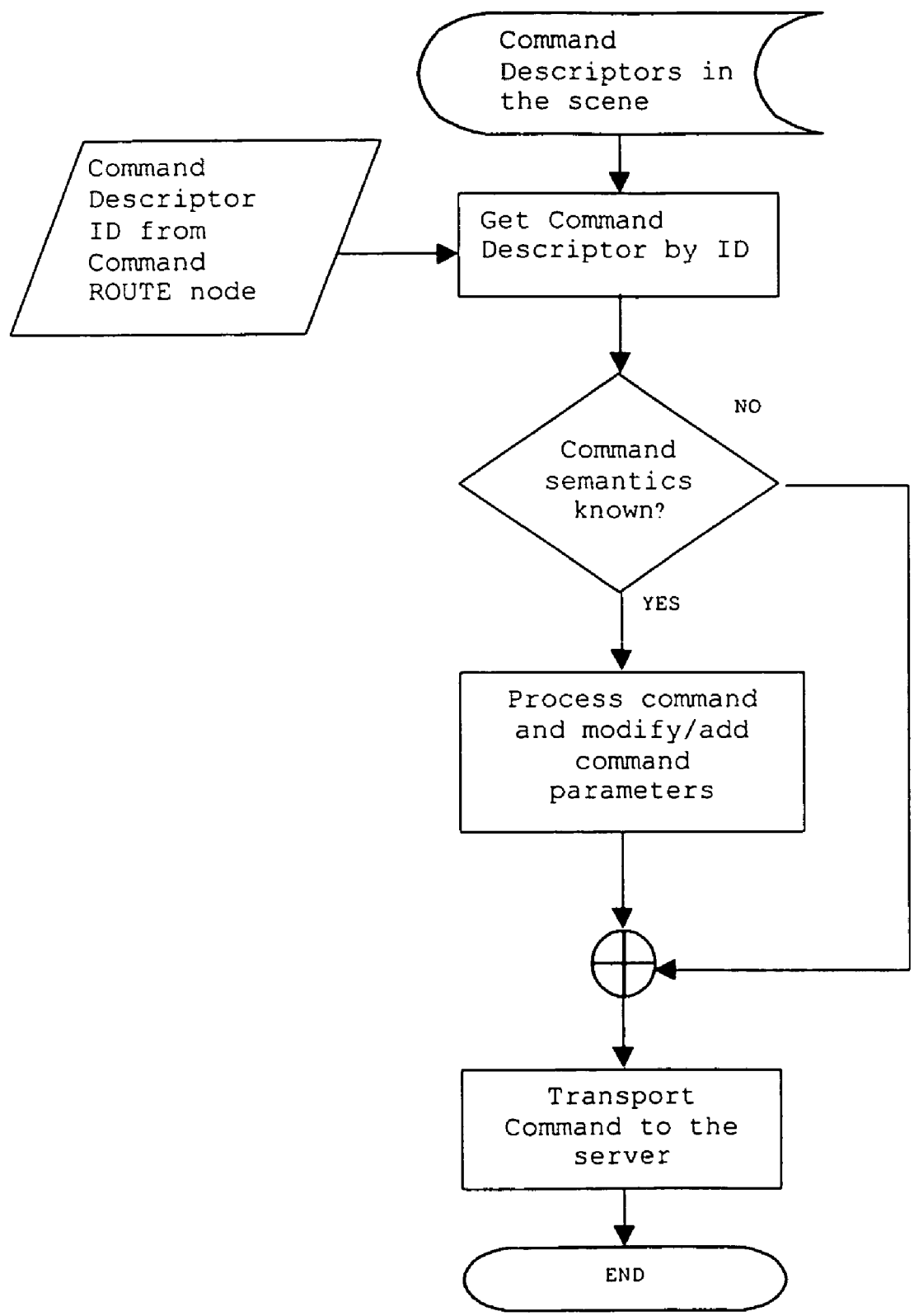
FIG. 15 is a flow diagram illustrating the process of assembling the data to be placed in the command sent back to the server, when Command Route nodes are used.

This process, for the Command Route node case, is depicted in FIG. 15. The sequence of steps is essentially identical to that of FIG. 13, the difference being that the reference for the Command Descriptor ID is now in the Command Route node rather than a Server Route.

The invention claimed is:

1. A method for communicating command information between a server and a client across a network in an interactive communication system, comprising the steps of:
generating a command message including a command, a command descriptor, and one of a server route for directly associating a node with the command descriptor and a command node for indirectly associating a node with the command descriptor; and
transmitting the command message across a network upon occurrence of a triggering event.

2. The method in accordance with claim 1, wherein the interactive communication system is based on MPEG-4.

3. The method in accordance with claim 2, wherein generating the command message is consistent with the local interactivity model defined in MPEG-4.

4. The method in accordance with claim 1, wherein the triggering event is a mouse click.

5. The method in accordance with claim 1, wherein the triggering event is a timer signal.

6. The method in accordance with claim 1, wherein command information is transmitted from the server to the client.

7. The method in accordance with claim 1, wherein command information is transmitted from the client to the server.

8. An interactive communication system comprising means for communicating command information across a network between a server and a client, wherein the means for communicating command information comprises:
means for generating a command message including a command, a command descriptor, and one of a server route for directly associating a node with the command descriptor and a command node for indirectly associating a node with the command descriptor; and
means for transmitting the command message across a network upon occurrence of a triggering event.

9. The system in accordance with claim 8, based on MPEG-4.

10. The system in accordance with claim 9, wherein generating the command message is consistent with the local interactivity model defined in MPEG-4.

11. The system in accordance with claim 8, wherein the triggering event is a mouse click.

12. The system in accordance with claim 8, wherein the triggering event is a timer signal.

13. The system in accordance with claim 8, wherein command information is transmitted from the server to the client.

14. The system in accordance with claim 8, wherein command information is transmitted from the client to the server.

* * * * *

UNITED STATES PATENT AND TRADEMARK OFFICE
CERTIFICATE OF CORRECTION

| | |
|---|---|
| PATENT NO. | : 7,149,770 B1 |
| APPLICATION NO. | : 09/240509 |
| DATED | : December 12, 2006 |
| INVENTOR(S) | : Kalva et al. |

It is certified that error appears in the above-identified patent and that said Letters Patent is hereby corrected as shown below:

IN THE SPECIFICATION:
On Page 1, Column 1, line 5, please insert the following header and paragraph:

-- Statement Regarding Federally Sponsored Research or Development
This invention was made with government support under grant number 8811111 awarded by the National Science Foundation. The government has certain rights in the invention. --

Signed and Sealed this

Seventeenth Day of June, 2008

JON W. DUDAS
*Director of the United States Patent and Trademark Office*